US010353876B2

(12) United States Patent
Hanson et al.

(10) Patent No.: US 10,353,876 B2
(45) Date of Patent: *Jul. 16, 2019

(54) DYNAMIC PROPERTY DATA INTEGRATION FRAMEWORK

(71) Applicant: International Business Machines Corporation, Armonk, NY (US)

(72) Inventors: David A. Hanson, Lake Forest, CA (US); Xin P. Lang, Beijing (CN); Wayne A. Malkin, Edmonton (CA); Lauren A. Mayes, Laguna Beach, CA (US); Evgeny Rozhdestvensky, Edmonton (CA)

(73) Assignee: International Business Machines Corporation, Armonk, NY (US)

( * ) Notice: Subject to any disclaimer, the term of this patent is extended or adjusted under 35 U.S.C. 154(b) by 15 days.

This patent is subject to a terminal disclaimer.

(21) Appl. No.: 13/936,963

(22) Filed: Jul. 8, 2013

(65) Prior Publication Data

US 2014/0032613 A1    Jan. 30, 2014

Related U.S. Application Data

(63) Continuation of application No. 13/560,810, filed on Jul. 27, 2012.

(51) Int. Cl.
*G06F 16/20* (2019.01)
*G06F 16/21* (2019.01)
*G06F 16/23* (2019.01)

(52) U.S. Cl.
CPC .......... *G06F 16/21* (2019.01); *G06F 16/2365* (2019.01)

(58) Field of Classification Search
CPC .......... G06F 17/30395; G06F 17/30398; G06F 17/30371; G06F 17/30289; G06F 17/30; G06F 16/21; G06F 16/2365
(Continued)

(56) References Cited

U.S. PATENT DOCUMENTS 6,694,335 B1 *  2/2004  Hopmann ......... G06F 17/30581
                                                707/624
7,010,503 B1 *  3/2006  Oliver et al. .................... 705/4
(Continued)

OTHER PUBLICATIONS

Office Action from U.S. Appl. No. 13/560,810, dated Nov. 7, 2013, 13 pp.

(Continued)

*Primary Examiner* — Kristopher Andersen
(74) *Attorney, Agent, or Firm* — Shumaker & Sieffert, P.A.

(57) ABSTRACT

A dynamic integration framework allows property data to be dynamically influenced by external data sources. In one example, a client services component receives, from a client application, a request to create or edit an object. The client services component retrieves, from a content repository, an initial property set applicable to the object. An external data service specifies an initial property modification set based on property dependencies between controlling property values and dependent properties. The external data service provides the property modifications to the client services component with an initial data identifier that indicates a state of the property modifications. The client services component merges the initial property modifications and the initial data identifier with the initial property set.

10 Claims, 8 Drawing Sheets

(58) Field of Classification Search
USPC .......................................................... 707/756
See application file for complete search history.

(56) References Cited

U.S. PATENT DOCUMENTS

| | | | |
|---|---|---|---|
| 2004/0139141 A1 | 7/2004 | Lessard | |
| 2005/0246687 A1 | 11/2005 | Scott | |
| 2007/0244848 A1* | 10/2007 | Chu | ................ G06Q 10/06 |
| 2008/0222217 A1* | 9/2008 | Gallagher et al. | ............ 707/203 |
| 2008/0250034 A1 | 10/2008 | Petri | |
| 2009/0018999 A1 | 1/2009 | Petri | |
| 2009/0234860 A1 | 9/2009 | Brown | |
| 2011/0022187 A1 | 1/2011 | Felts et al. | |
| 2011/0184958 A1 | 7/2011 | Krishnamoorthy et al. | |
| 2011/0191786 A1 | 8/2011 | Ma et al. | |
| 2011/0252148 A1 | 10/2011 | Pujol et al. | |
| 2011/0276632 A1 | 11/2011 | Anderson et al. | |

OTHER PUBLICATIONS

Response filed Feb. 7, 2014 to the Office Action from U.S. Appl. No. 13/560,810, dated Nov. 7, 2013, 13 pp.

Zhu et al.; "Evaluating and Selecting Web Sources as External Information Resources of A Data Warehouse", Proceedings, 3rd Inter. Conf. on Web Information Systems Engineering, Dec. 12-14, 2002, pp. 149-160.

Siemens AG et al.; "Automatic Protection of PPR Data During the Integration with External Data Source", IPCOM000185676D, Aug. 14, 2009 (5 pages).

U.S. Appl. No. 13/560,810, filed Jul. 27, 2012 by David A. Hanson et al. entitled Dynamic Porperty Data Integration Framework.

Final Office Action from U.S. Appl. No. 13/560,810, dated Apr. 8, 2014, 16 pp.

Amendment in Response to Final Office Action dated Apr. 8, 2014, from U.S. Appl. No. 13/560,810, filed Sep. 5, 2014, 18 pp.

Response to Office Action dated Jul. 8, 2015, from U.S. Appl. No. 13/560,810, filed Oct. 7, 2015, 14 pp.

Office Action from U.S. Appl. No. 13/560,810, dated Jul. 8, 2015, 24 pp.

Amendment in Response to Final Office Action dated Dec. 16, 2015, from U.S. Appl. No. 13/560,810, filed Mar. 11, 2016, 10 pp.

Final Office Action from U.S. Appl. No. 13/560,810, dated Dec. 16, 2015 21 pgs.

Office Action from U.S. Appl. No. 13/560,810, dated Jun. 16, 2016, 17 pp.

Response to Non-Final Office Action dated Jun. 16, 2016 from U.S. Appl. No. 13/560,810, filed Sep. 16, 2016 12 pgs.

Final Office Action from U.S. Appl. No. 13/560,810 dated Nov. 30, 2016, 18 pp.

Advisory Action from U.S Appl. No. 13/560,810, dated Mar. 1, 2017, 5 pp.

Amendment in Response to Office Action dated Nov. 30, 2016, from U.S. Appl. No. 13/560,810, filed Jan. 30, 2017, 9 pp.

Amendment in Response to the Final Office Action dated Nov. 30, 2016 and the Advisory Action dated Mar. 1, 2017, from U.S. Appl. No. 13/560,810, filed Mar. 30, 2017, 10 pp.

Amendment in Response to Office Action dated Sep. 22, 2017, from U.S. Appl. No. 13/560,810, filed Dec. 21, 2017, 11 pp.

Office Action from U.S. Appl. No. 13/560,810, dated Sep. 22, 2017, 16 pp.

Final Office Action from U.S. Appl. No. 13/560,810, dated Mar. 13, 2018, 16 pp.

Response to Final Office Action from U.S. Appl. No. 13/560,810, dated Mar. 13, 2018, filed May 9, 2018, 11 pp.

Advisory Action from U.S. Appl. No. 13/560,810, dated May 31, 2018, 2 pp.

Response to Final Office Action from U.S. Appl. No. 13/560,810, dated Mar. 13, 2018 and Advisory Action dated May 31, 2018, filed Jun. 11, 2018, 12 pp.

Office Action from U.S. Appl. No. 13/560,810, dated Oct. 5, 2018, 8 pp.

Response to the Office Action dated Oct. 5, 2018, from U.S. Appl. No. 13/560,810, filed Jan. 7, 2019, 20 pp.

Notice of Allowance from U.S. Appl. No. 13/560,810, dated Mar. 6, 2019, 15 pgs.

* cited by examiner

DYNAMIC PROPERTY DATA INTEGRATION FRAMEWORK

This application is a continuation of Ser. No. 13/560,810, filed on Jul. 27, 2012, entitled DYNAMIC PROPERTY DATA INTEGRATION FRAMEWORK, the entire content of which is incorporated herein by reference.

TECHNICAL FIELD

The disclosure relates to an object based management system, and in particular, to coordinating data integration in a content management system or other object based management system.

BACKGROUND

A content management system may store objects that either hold content or are related in some way to objects that hold content, such as folder objects that organize such objects. These various objects typically have certain properties. The properties can be system-defined properties, present at all installations, or custom-defined properties that a user adds at a particular installation. In many environments, a client application may provide features that allow a user to edit the values of these properties. The current property values are fetched from an existing object or the default values are fetched for a new object. The user may make one or more changes to the property values before saving the object. While the user is editing the object, the values are considered the working values of the properties, and have not yet been persisted to the content management repository. The content management repository holds certain metadata or attributes about properties such as allowable minimum and maximum values or a list of allowable choices.

SUMMARY

In general, this disclosure describes techniques that allow data within a content repository to be integrated with a data source, such as a data source external to the content repository. Moreover, examples discussed herein allow the property data within the content repository (e.g., properties and metadata associated with content of the content repository) to be dynamically influenced by the data source. Further, the data source may influence values of the property data while the property data is currently being edited. Other examples may include techniques for enabling data within a variety of types of object based management systems to be integrated with an external data source.

In one example, a method includes one or more computing devices receiving, from a client application, a request to create or edit an object. The method further includes at least one of one or more processors of the one or more computing devices retrieving, from a content repository, an initial property set applicable to the object. The method further includes at least one of the one or more processors of the one or more computing devices to specify an initial property modification set based at least in part on one or more property dependencies between the values of one or more controlling properties and one or more dependent properties. The method further includes at least one of the one or more processors of the one or more computing devices merging the one or more property modifications with the initial property set, thereby forming a modified property set.

In another example, a computing system includes one or more processors and one or more computer-readable tangible data storage devices. The computing system further includes program instructions, stored on at least one of the one or more computer-readable tangible data storage devices, to configure an external data service to execute on at least one of the one or more processors. The computing system further includes program instructions, stored on at least one of the one or more computer-readable tangible data storage devices, for a client services component that executes on at least one of the one or more processors to receive, from a client application, a request to create or edit an object. The computing system further includes program instructions, stored on at least one of the one or more computer-readable tangible data storage devices, for the client services component to retrieve, from a content repository, an initial property set applicable to the object. The computing system further includes program instructions, stored on at least one of the one or more computer-readable tangible data storage devices, for the external data service to specify a property modification set including metadata modifications and/or value modifications based at least in part on one or more property dependencies between the values of one or more controlling properties and one or more dependent properties whose state depends at least in part on at least one of the one or more controlling properties. The computing system further includes program instructions, stored on at least one of the one or more computer-readable tangible data storage devices, for the external data service to provide the one or more property modifications with an initial data identifier that indicates a state of the metadata modifications in the one or more property modifications as well as other context as is relevant to the external data service. The computing system further includes program instructions, stored on at least one of the one or more computer-readable tangible data storage devices, for the client services component to merge the one or more property modifications and the initial data identifier with the initial property set, thereby forming a modified property set.

In another example, a computer program product includes one or more computer-readable tangible data storage media and program instructions stored on at least one of the one or more computer-readable tangible storage media. The computer program product includes program instructions, stored on at least one of the one or more computer-readable tangible data storage media, for a client services component to receive, from a client application, a request to create or edit an object. The computer program product includes program instructions, stored on at least one of the one or more computer-readable tangible data storage media, for the client services component to retrieve, from a content repository, an initial property set applicable to the object. The computer program product includes program instructions, stored on at least one of the one or more computer-readable tangible data storage media, for an external data service to specify an initial property modification set based at least in part on one or more property dependencies between the values of one or more controlling properties and one or more dependent properties whose state depends at least in part on the values of at least one of the one or more controlling properties, as indicated by information from one or more external data sources, thereby generating one or more property modifications. The computer program product includes program instructions, stored on at least one of the one or more computer-readable tangible data storage media, for the external data service to provide the one or more property modifications with an initial data identifier that indicates a state of the metadata modifications in the one or more property modifications. The computer program product includes program instructions, stored on at least one of the one or more computer-readable tangible data storage media, for the client services component to merge the one or more property modifications and the initial data identifier with the initial property set, thereby forming a modified property set.

The details of one or more embodiments are set forth in the accompanying drawings and the description below. Other features, objects, and advantages will be apparent from the description and drawings, and from the claims.

DETAILED DESCRIPTION

There are set forth herein examples of a method, computing system, and computer program product for a dynamic property data integration framework that includes a client services component and an external data service. Various embodiments of a dynamic property data integration framework disclosed herein may coordinate data between a client application and one or more external data sources, among various other features and advantages. Various illustrative features and advantages of a dynamic property data integration framework are further described below with reference to FIGS. 1-9.

Figure 1:
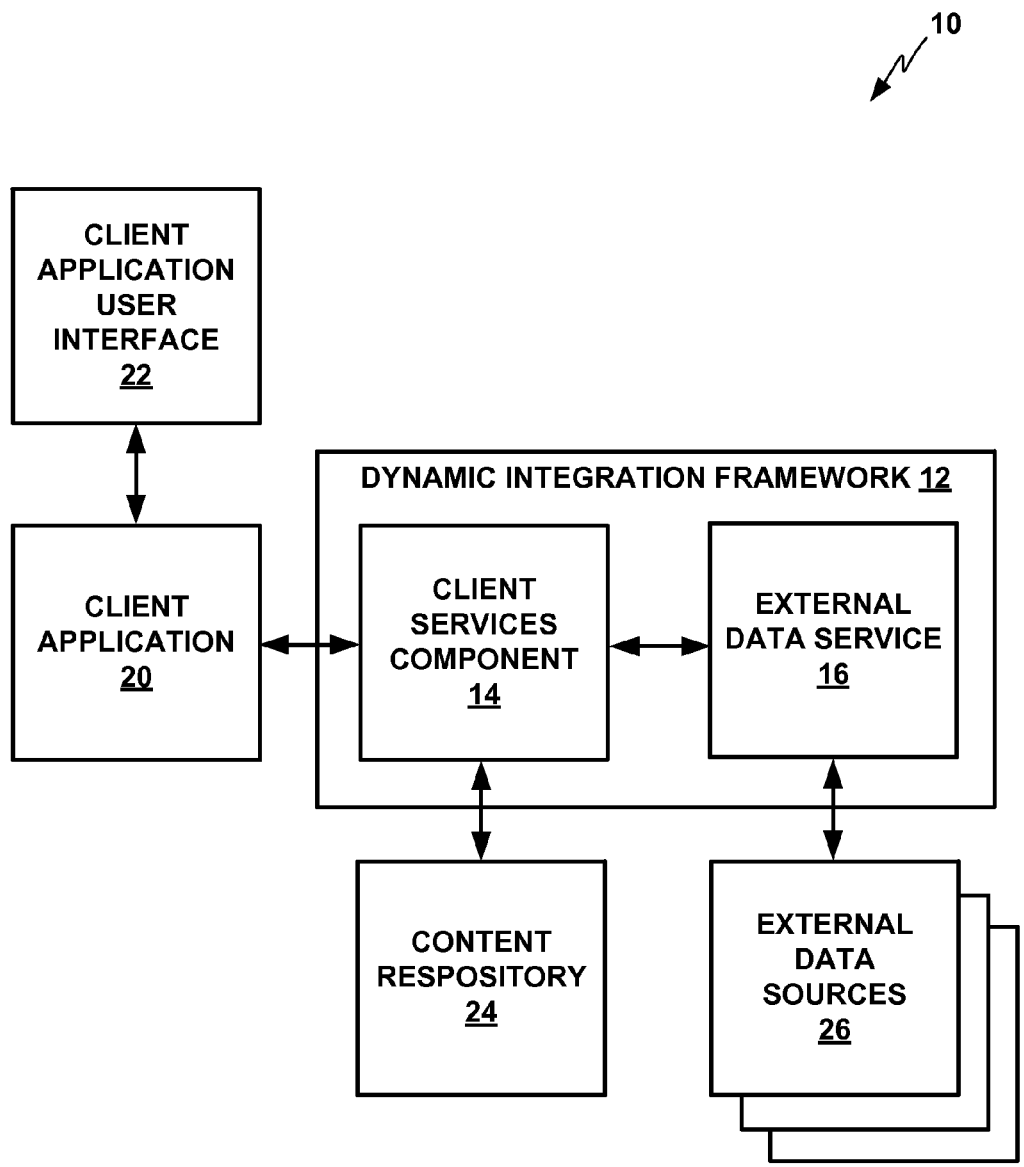
FIG. 1 is a block diagram of an example computing environment configured for coordinating data between a client application and one or more external data sources.

FIG. 1 is a block diagram of an example computing environment 10 that includes a dynamic integration framework 12 configured for coordinating data between a client application 20 and one or more external data sources 26. Aspects are provided as follows for an illustrative example of computing environment 10. In this example, dynamic integration framework 12 includes a client services component 14 and an external data service 16. Client services component 14 and external data service 16 may each run on their own application servers and communicate with each other, in one example. Client services component 14 communicates with a client application 20, which may be a case manager application or other type of content manager application, for example. Client application 20 communicates with a client application user interface 22, which may be a browser-based client interface, for example. Client services component 14 communicates with a content repository 24, and external data service 16 communicates with external data sources 26.

As described in further detail below, dynamic integration framework 12 allows data within content repository 24 to be integrated with one or more of data sources, such as one or more of external data sources 26. Moreover, examples discussed herein allow property data within content repository 24 (e.g., properties and metadata associated with content of the content repository) to be dynamically influenced by external data sources 26. Further, external data sources 26 may influence values of the property data when the property data is currently being edited by client application user interface 22 of client application 20. An example implementation for computing environment 10 including client services component 14 and an external data service 16 is shown in FIG. 2, which provides illustrative context in which examples of computing environment 10 may be further described.

Figure 2:
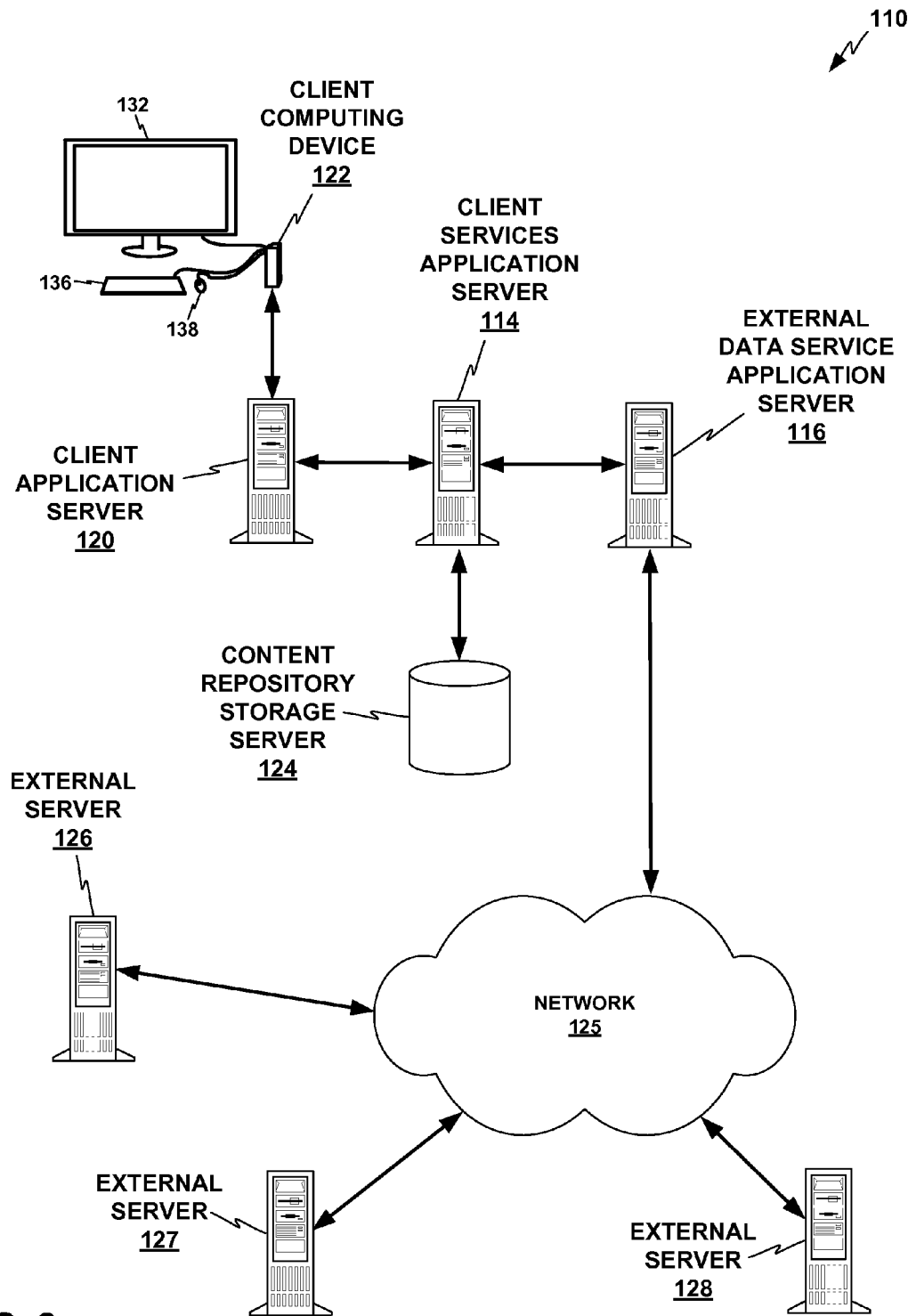
FIG. 2 is a schematic diagram of an example computing environment configured for coordinating data between a client application and one or more external data sources.

FIG. 2 is a block diagram of a computing network environment 110 as one example implementation in which a dynamic property data integration framework 12 as shown in FIG. 1 may be implemented, according to an illustrative example. FIG. 2 depicts an environment of computing devices including client services application server 114 and external data service application server 116 that may implement, execute, or embody software and/or hardware for an client services component 14 and an external data service 16 as depicted in and described with reference to FIG. 1. As implemented in example computing environment 110, client services application server 114 and external data service application server 116 are configured for coordinating data between a client application running on client application server 120, which may execute or embody client application 20 shown in FIG. 1, and one or more external data sources running on representative external servers 126, 127, and 128, which may embody external data sources 26 shown in FIG. 1. For example, client services application server 114 and external data service application server 116 may provide a dynamic integration framework that allows property data within a content repository maintained by content repository storage server 124 to be dynamically influenced by external data sources provided by external servers 126, 127, and 128, when the property data is currently being edited by client applications executing on client application server 120 or client computing device 122.

For example, client computing device 122 may execute or embody client application user interface 22 shown in FIG. 1, and may communicate with client application server 120. Client computing device 122 may have user input/output components connected to it such as monitor 132, keyboard 136, and mouse 138, as in the example shown in FIG. 2. Other implementations may include a client application user interface 22 running on other forms of client computing devices including smartphones, notebook computers, laptop computers, or other mobile devices that have a touchscreen or keyboard, touchpad, and monitor incorporated therein, for example.

In the example of FIG. 2, client services application server 114 is communicatively connected to content repository storage server 124 which may embody content repository 24 shown in FIG. 1. In other examples, content repository 24 may be hosted on client services application server 114, on an external data storage component connected to client services application server 114, on a storage area network (SAN), a redundant array of independent discs (RAID), or other form of distributed storage, or other implementation. A content repository may also encompass a database or other data store to hold the property data, in the way of values and metadata, of the objects in the content management system as well as other information about the objects. The content repository may include devices (e.g. RAID, SAN) to hold the content and a database to hold information about the content holding objects as well as other objects. External data service application server 116 communicates with external servers 126, 127, 128 via network 125, which may be the Internet or a local area network (LAN), for example. A wide array of other options may be used for different implementations, some of which are described further below.

Given the context of the example implementation of FIG. 2 and returning to the example of FIG. 1, content repository 24 stores property values and property metadata for objects for a content management system that may be relevant to client application 20. The property values, property metadata, as well as other attributes for an object may together be considered to be the property set for the object. Client services component 14 coordinates property sets for objects, including metadata about properties of the objects, in a way that is not merely static and applicable to all objects of a certain class of object. Rather, client services component 14 provides the client application 20 with property sets that are dynamic in nature based on on-going edits a user is performing in client application user interface 22, as well as based on up-to-date information from external data service 16. Often the information that determines the information about properties already resides in another data source 26 external to the content management repository 24.

Figure 3:
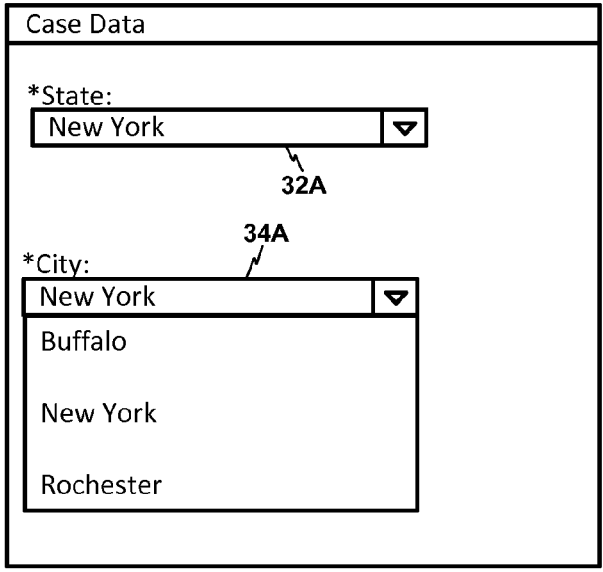
FIG. 3 depicts a screenshot of a representative graphical user interface window of a client application user interface making use of data coordination between a client application and one or more external data sources.
Figure 4:
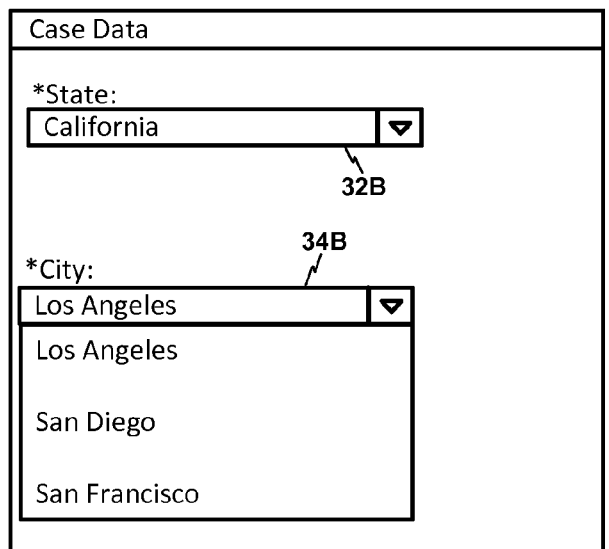
FIG. 4 depicts a screenshot of a representative graphical user interface window of a client application user interface making use of data coordination between a client application and one or more external data sources.

For example, a property that selects a City may depend on what State has been selected in another property. So, the properties presented for available options for a City object may be determined by what State property has been selected for another object. Example user interface windows depicting this are shown in FIGS. 3 and 4. FIG. 3 depicts a screenshot of a representative graphical user interface (GUI) window 30 that may be displayed on client application user interface 22 making use of data coordination between client application 20 and one or more external data sources 26, in particular, an external data source that provides data for City objects as properties of particular State objects, and that make available data for cities within each state. In the GUI window 30 as shown in FIG. 3, a particular State value, or value choice, for New York has been selected in State field 32A. With this State value choice selected, dynamic integration framework 12 has provided information on available City value choices that correspond with the selected State value choice, and returns these value choices for the client application 20 to display as options for the City field 34A. A user may make an edit to the State object field 32A, the result of which is shown in FIG. 4. FIG. 4 depicts a screenshot of an altered GUI window 36 as it may be displayed on client application user interface 22 making use of data coordination between client application 20 and one or more external data sources 26. In the GUI window 36 as shown in FIG. 4, a new State value choice for California has been selected by a user edit in State field 32B. With this State value choice selected, dynamic integration framework 12 has provided information on available City value choices that correspond with the newly selected State value choice, and returns these objects for the client application 20 to display as new options for the City field 34B.

While the appropriate cities within different states is fairly static, many other bodies of data are susceptible of frequent change. For example, other types of external data sources 26 may be a customer database from which a list of valid customer IDs, or a list of valid customer accounts, or a list of valid customer payment information, may be obtained. This type of information may be expected to change frequently, with many significant updates and changes made every day for a customer database of significant size. If the information from such an external data source 26 were duplicated in the content repository 24, this would lead to a need to maintain synchronization with the external data source 26, which would add a substantial operational burden and source of potential errors to each instance of content repository 24, which are typically not designed to be capable of addressing synchronization issues. Instead, dynamic integration framework 12 enables a mirroring or synchronization of the data in the external data sources 26 with what is stored in content repository 24, and so provides synchronization to instances of content repository 24 without imposing the burden of handling the synchronization on each instance of content repository 24. Additionally, dynamic integration framework 12 not only performs simple synchronization with external data sources 26, but dynamically manages modification of properties, attributes, and property metadata (i.e. collectively, "property data" or "property set") by client application 20 in combination with constraints imposed by up-to-date information from external data sources 26.

External data service 16 may also be enabled to be configured according to a customized settings to control a selection of external data sources 26 with which to interact, and custom settings for what constraints external data service 16 will seek or accept from external data sources 26, or how external data service 16 will use data from external data sources 26 to influence property data. Client services component 14 and external data service 16 may support the firing and handling of events, allowing custom code to inject certain information into these event payloads, in a way that may be custom configured and unique to a particular dynamic integration framework 12 or for a particular setting of dynamic integration framework 12 for supporting a particular client application 20.

Client services component 14 integrates data from external data sources 26 with content repository 24. Client services component 14 may perform this data integration for any of a variety of client applications 20 built using different technologies or frameworks. In one example, client services component 14 may have a RESTful interface, i.e. an interface that conforms with Representational State Transfer (REST), that performs content management actions for client applications 20 that are web-based applications. Client services component 14 also integrates with the external data service 16 to enable working values of property sets to be influenced by external data sources 26. In one example, external data service 16 remains stateless and does not itself store values of properties, but rather, external data service 16 modifies working values of the property data or modifies metadata about the properties as they are being edited in client application 20, before they are persisted in the content repository 24. In one example, external data service 16 may also have a RESTful interface, in addition to the interface to the client services component 14. A user of client application 20 making use of dynamic integration framework 12 may enter a configuration input to integrate dynamic integration framework 12 with any selected instance of a client application 20 and/or external data sources 26. For example, a user may simply register a URL with the client services component 14 to enable integration of dynamic integration framework 12 with a selected instance of a client application 20 and an external data source 26.

As a user makes edits, the client services component 14 may communicate changes made to working values of an object from client application 20 to external data service 16 while a user is editing the object in client application 20. Client services component 14 may communicate by exchanging payloads with external data service 16. External data service 16 may specify changes to the working values or metadata of the properties in view of data from external data sources 26, which may include additional constraints or selections of data that may invalidate a working value, for example. Constraints on working values of the property set that the external data service 16 may control may, as illustrative examples, include: minimum and maximum values of properties such as integers, floating points, and dates and times; maximum length of properties such as strings; a choice list of allowable values; an attribute that designates a property as controlling dependent properties; a working value of a property itself; and custom validation error information, for example. The external data service 16 may modify certain attributes about properties, such as minimum and maximum values and choice lists, for example. Content repository 24 may also impose restrictions on how the attributes or other aspects of a property set can be modified. The external data service 16 may make more restrictive changes to the attributes in a property set than those required by the content repository 24, such as a smaller maximum value as indicated by an external data source, but while avoiding making less restrictive changes that would contradict the requirements of the content repository 24. In other words, the external data service 16 may track requirements or indications from both content repository 24 and external data sources 26, and specify property modifications to conform to requirements or indications from the combination of content repository 24 and external data sources 26.

In one illustrative example, the external data service 16 may modify a working value of a property if edits to the property would cause another property to come to have a choice list that causes its working value to be invalid. The external data service 16 may opt to automatically assign a valid value to the property based on the new choice list, or to provide information about the contradiction to client application 20 to inform the user of other options for making both property values consistent. External data service 16 may also perform complex validation logic that doesn't fit within the simple constraints advertised through attributes such as minimum/maximum values and choice lists. For example, external data service 16 may compare a working value of a customer account number as entered by user edits in client application 20 to a customer account database in external data sources 26 and determine whether the entered customer account number is a valid account number. In this case, instead of modifying the working value of a property, external data service 16 may return error information to indicate why the current working value is invalid.

The external data service 16 may designate certain properties as controlling the dynamic behavior of dependent properties. When a user updates a value for such a property in client application 20, the client application 20 makes another call through the client services component 14 to the external data service 16 to fetch properties that have changed based on the other property change as updated by the user. To support this dynamic behavior, the client application 20 only needs to recognize the attribute that designates a property as exhibiting dynamic behavior of dependent properties and respond to it when the value of that property is modified. The client application 20 does not need to know what properties are actually controlled by the dynamic controlling property. The external data service 16 responds with any properties that have any attributes that change based on the change to the dynamic controlling property value.

In this implementation, the external data service 16 is stateless. The external data service 16 returns an opaque external data identifier that captures any state information needed to indicate what modifications to metadata or other attributes are being returned for a property from a given call. The client application 20 maintains this opaque data identifier on behalf of the external data service 16. When the client application 20 makes another call through the client services component 14 to the external data service 16 because a user in the client application 20 has updated a property that controls the dynamic attributes of other properties, the client application 20 passes this opaque data identifier back to the external data service 16 along with the current working values. It is this opaque data identifier that allows the external data service 16 to determine what modifications to metadata or attributes are different from the modifications that were output previously by the external data service and incorporated in the property set output to the client application.

The opaque data identifier may be implemented as a short identifier used to identify a particular metadata modification definition used for one or more properties to control attributes such as minimum/maximum values and choice lists. For example, in a list of conditions that determine what metadata modification definition for one or more properties to use based on the working value of another property, the data identifier may be the index of the matching condition. The external data service 16 can capture these metadata modification definition identifiers in the opaque external data identifier returned to the client application 20. If the metadata modifications are different from the metadata modifications appropriate for the current working values based on the configuration identifiers captured in the previous opaque identifier, the external data service 16 may return the relevant property modifications in the list of changed properties. The external data service 16 may also return a property modification in the list of changed properties if it automatically modifies the working value of that property or whether it returns custom validation error information about the value for that property.

Figure 5:
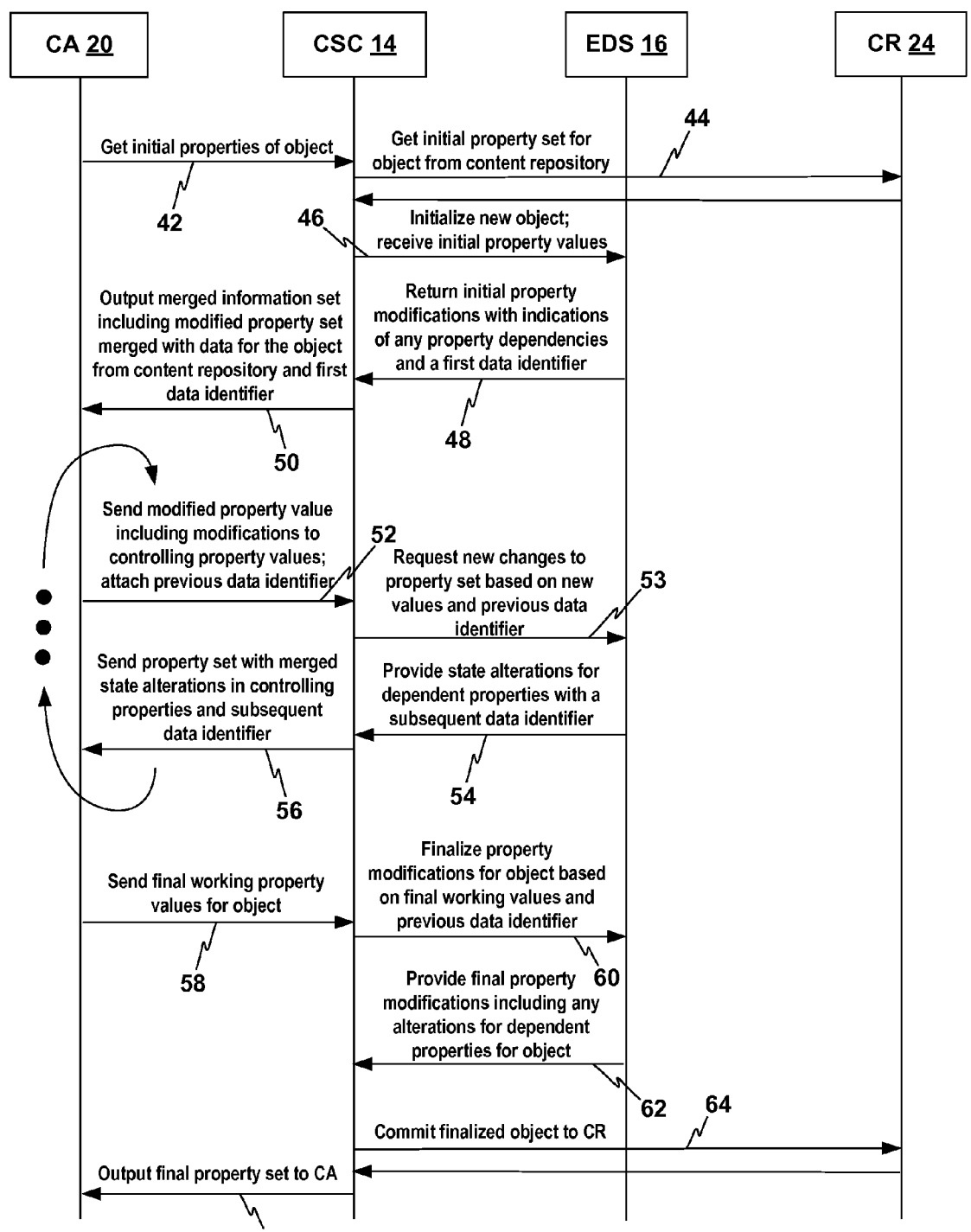
FIG. 5 is a flow diagram for an example method of coordinating data between a client application and one or more external data sources.

FIG. 5 is a flow diagram for an example method 40 of coordinating data between a client application 20 and one or more external data sources 26 as depicted in FIG. 1. FIG. 5 shows communications for an example dialogue among client application 20, client services component 14, external data service 16, and content repository 24. In this example dialogue, client application 20 may start a session to edit an object, and make a call to the client services component 14 to fetch the initial properties of the object (42). The object it is editing could be a new object that has not yet been created in the repository or it could be an existing object that it is modifying. The client services component 14 makes a call to the content repository 24 to establish the working values of the initial set of properties for the object (44). This may be the default values for a new object or the current values of an existing object as well as static metadata about the properties as maintained by the repository. The client services component 14 passes the working values to the external data service 16, enabling the external data service 16 to influence the initial set of working values and metadata and other attributes about the properties (46). Client services component 14 may pass the working values to the external data service 16 in the form of the following example payload implemented in HTTP:

```
POST /testservice/ICMEDREST/type/DH2_MyCase
{
    "repositoryId": "CMTOSDH",
    "requestMode": "initialNewObject",
    "properties": [
        // Payload may include additional properties
        // not meaningful to the external data service
        // ...
        {
            "symbolicName": "DH2_State",
            "value": null
        },
        {
            "symbolicName": "DH2_City",
            "value": null
        }
    ]
}
```

This example is provided in JavaScript Object Notation (JSON) format, while other formats may also be used in other implementations. The external data service 16 may respond to the client services component 14 with modifications to the values, metadata and attributes of the properties that it controls, as well as with indications of any property dependencies, and an opaque external data identifier appropriate for the initial set of working values, as in the following example HTTP payload (48):

```
{
    "externalDataIdentifier": "-1,0",
    "properties": [
        {
            "symbolicName": "DH2_State",
            "required": true,
            "maxLength": 2,
            "hasDependentProperties": true,
            "choiceList": {
                "displayName": "StateChoiceList",
                "choices": [
                    {
                        "displayName": "New York",
                        "value": "NY"
                    },
                    {
                        "displayName": "California",
                        "value": "CA"
                    },
                    {
                        "displayName": "Nevada",
                        "value": "NV"
                    }
                ]
            }
        },
        {
            "symbolicName": "DH2_City",
            "value": null,
            "displayMode": "readonly",
            "hidden": true,
            "required": true,
            "hasDependentProperties": false
        }
    ]
}
```

The client services component 14 merges this information with information not controlled by external data from the external data sources accessible to external data service 16, returning the complete set of information about the properties to the client application 20 (50). This information includes the opaque external data identifier returned by the external data service 16.

The client application 20 may subsequently modify a value of a property that is designated as controlling the dynamic behavior of dependent properties. The client application 20 may make another call to the client services component 14 requesting any dependent changes. In this call, the client application 20 passes the current working values, including the change that triggered the dependent changes, as well as the previous opaque external data identifier to the client services component 14 (52).

The client services component 14 calls the external data service 16 to request the dependent changes based on new property values, including passing the opaque external data identifier to the external data service 16 so the external data service 16 can calculate which properties have changed (53). This call from client services component 14 to the external data service 16 may, for example, take the form of the following HTTP payload:

```
POST /testservice/ICMEDREST/type/DH2_MyCase
{
    "repositoryId": "CMTOSDH",
    "requestMode": "inProgressChanges",
    "externalDataIdentifier": "-1,0",
    "properties": [
        // Non-external data related properties
        // ...
        {
            "symbolicName": "DH2_State",
            "value": "CA"
        },
        {
            "symbolicName": "DH2_City",
            "value": null
        }
    ]
}
```

The external data service 16 may then respond to the client services component 14 with property modifications that have any metadata or attributes that are different based on the working values from the current call from the client services component 14 and the previous opaque external data identifier, as also included in the current call from the client services component 14 (54), or that require value modifications or value validation information based on the different metadata or other custom logic. As an example, the following example payload is provided in which only the City property is different based on a new value for State, as shown in the changes indicated in FIGS. 3 and 4. This example also shows a new opaque external data identifier with which the external data service 16 may respond, based on the new attributes:

```
{
    "externalDataIdentifier": "1,0",
    "properties": [
        {
            "symbolicName": "DH2_City",
            "hidden": false,
            "required": true,
            "hasDependentProperties": false,
            "choiceList": {
                "displayName": "CityChoiceList",
                "choices": [
                    {
```

-continued

```
                "displayName": "Los Angeles",
                "value": "Los Angeles"
            },
            {
                "displayName": "San Diego",
                "value": "San Diego"
            },
            {
                "displayName": "San Francisco",
                "value": "San Francisco"
            }
          ]
        }
      ]
    }
  ]
}
```

The client services component 14 may then merge in any metadata or attributes to the properties that the external data service 16 did not specify or does not control, and return this modified property set back to the client application 20 (56), containing only those properties that are different in some way from the property set and working values that the client is currently holding. As indicated in FIG. 5, method 40 may include repeated cycles of these communications from client application 20 to client services component 14, from client services component 14 to external data service 16, from external data service 16 back to client services component 14, and from client services component 14 back to client application 20 (52, 53, 54, 56).

At some point, the user completes the editing session and commits the changes made during the editing session. The client application 20 makes a final call to the client services component 14 to create the new object or save the changes to the existing object (58). The client services component 14 makes a final call to the external data service 16 to fetch the data for properties based on the final working values (60). External data service 16 makes any final state alterations or modifications to the property set, or any final validation of the working values for the property set, based on the data available to it from its external data sources, and returns its final property set modifications to the client services component 14 (62). Client services component 14 may then merge the final property modifications from the external data service 16 into the property set, perform any final validation of the values based on data from the external data service 16, and merge any property data or perform any validation due to constraints of the content repository 24, before committing the finalized object with the finalized property values to content repository 24 (64). Client services component 14 may also output the final property set to the client application 20 (66).

Client services component 14 and external data service 16 may each be implemented in any of a wide variety of types of software, including as applications running on respective application servers, or as web applications or desktop applications, for example. In one example, client services component 14 and external data service 16 may each be written in Java, and each run on a separate application server. In other examples, either or both of client services component 14 and external data service 16 may be written in C, C++, JavaScript, Python, Ruby, Clojure, or any other language. In other examples, client services component 14 and external data service 16 may be written as parts of a single dynamic integration framework application that may be executed by multiple servers or other computing devices or a single server or other computing device.

Figure 6:
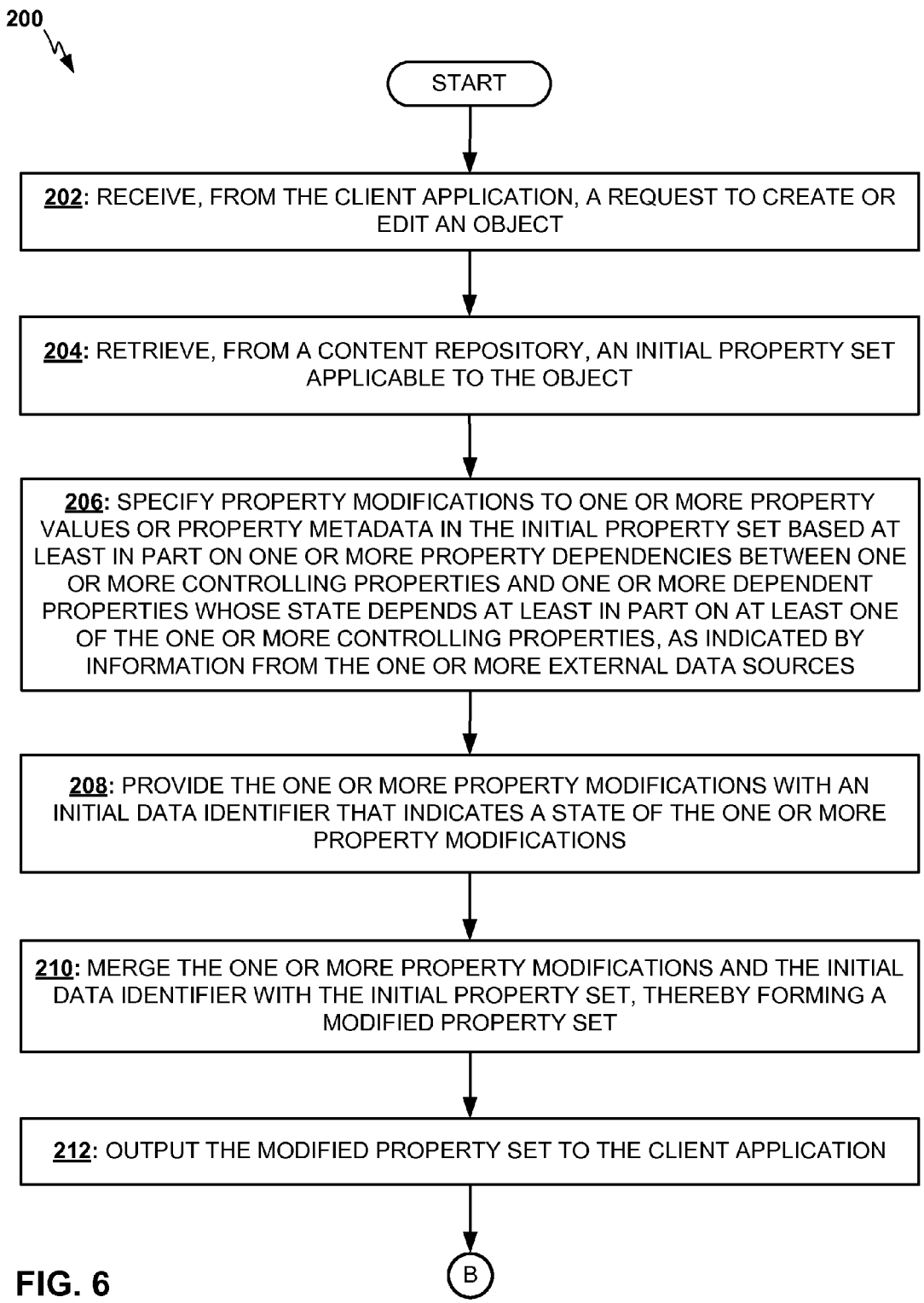
FIG. 6 is a flowchart illustrating operation of an example method for coordinating data between a client application and one or more external data sources.

FIG. 6 is a flowchart illustrating operation of an example method 200 for one or more computing devices, such as either or both of servers 114 and 116 depicted in FIG. 2, to provide a dynamic property data integration framework that coordinates data between a client application and one or more external data sources such as is depicted in FIGS. 1 and 2. Method 200 is illustratively described as follows with reference to the examples depicted in FIGS. 1 and 2. In these examples, it may be understood that when client services component 14 or external data service 16 performs a function or task, this may take the form of aspects of that function or task being performed or executed by a computing device or one or more processors of a computing device. For example, functions or tasks performed by client services component 14 may be considered to be performed or executed by client services application server 114 or one or more processors thereof, and functions or tasks performed by external data service 16 may be considered to be performed or executed by external data service application server 116 or one or more processors thereof. In other examples, aspects of functions or tasks of both client services component 14 or external data service 16 may be performed or executed by the same computing device or the same processor, or may be performed by more than two different servers or other computing devices, including by being performed by one or more virtual machines or virtual servers that may run on an abstracted layer spread across multiple computing devices or multiple data centers, for example.

In method 200, one or more computing devices, such as client services application server 114 running client services component 14, receive, from the client application 20, a request to create or edit an object (202). Client services component 14, which may run on one or more processors, such as processors of client services application server 114, retrieves, from a content repository 24, an initial property set applicable to the object (204). Client services component 14 may then pass the current values of the initial property set for the object to external data service 16.

External data service 16, running on one or more processors, such as processors of external data service application server 116, specifies property modifications applicable to the current working values of the initial property set based at least in part on one or more property dependencies between one or more controlling properties and one or more dependent properties whose state depends at least in part on the values of at least one of the one or more controlling properties, as indicated by information from the one or more external data sources, thereby generating one or more property modifications (206). External data service 16 may track information from the one or more external data sources at frequent or regular intervals or more or less continuously, or may rapidly query one or more external data sources for current information as part of specifying property modifications applicable to the working values from the initial data set, in different examples. In these examples, external data service 16 may thereby provide current or up-to-date modifications or constraints on the properties of the object based on dynamically updated information from and knowledge of the relevant external data sources, and provide that dynamically up-to-date information for the client application 20 without the client application 20 or the client services component 14 having to try to track such information from external data sources.

External data service 16 then provides the one or more property modifications with an initial data identifier that indicates a state of the one or more property modifications (208). This initial data identifier may be an initial version of an obscure external data identifier that is understood by the external data service 16 but is obscure to the client application 20. External data service 16 may then pass the property modifications and the initial data identifier to the client services component 14.

Client services component 14 merges the one or more property modifications and the initial data identifier with the initial property set, thereby forming a modified property set (210). Client services component 14 then outputs the modified property set to the client application 20 (212). Client application 20 may thereby make use of a property set for the object that is modified to take into account current or up-to-date information from the appropriate external data sources, without needing its own capability to find, track, and interact with the appropriate external data sources for the object, in this example. Any portion of or all of method 200 may also be performed by only one software module executing on one server or other computing device, or on additional software modules and/or computing devices beyond those mentioned in the example above.

Figure 7:
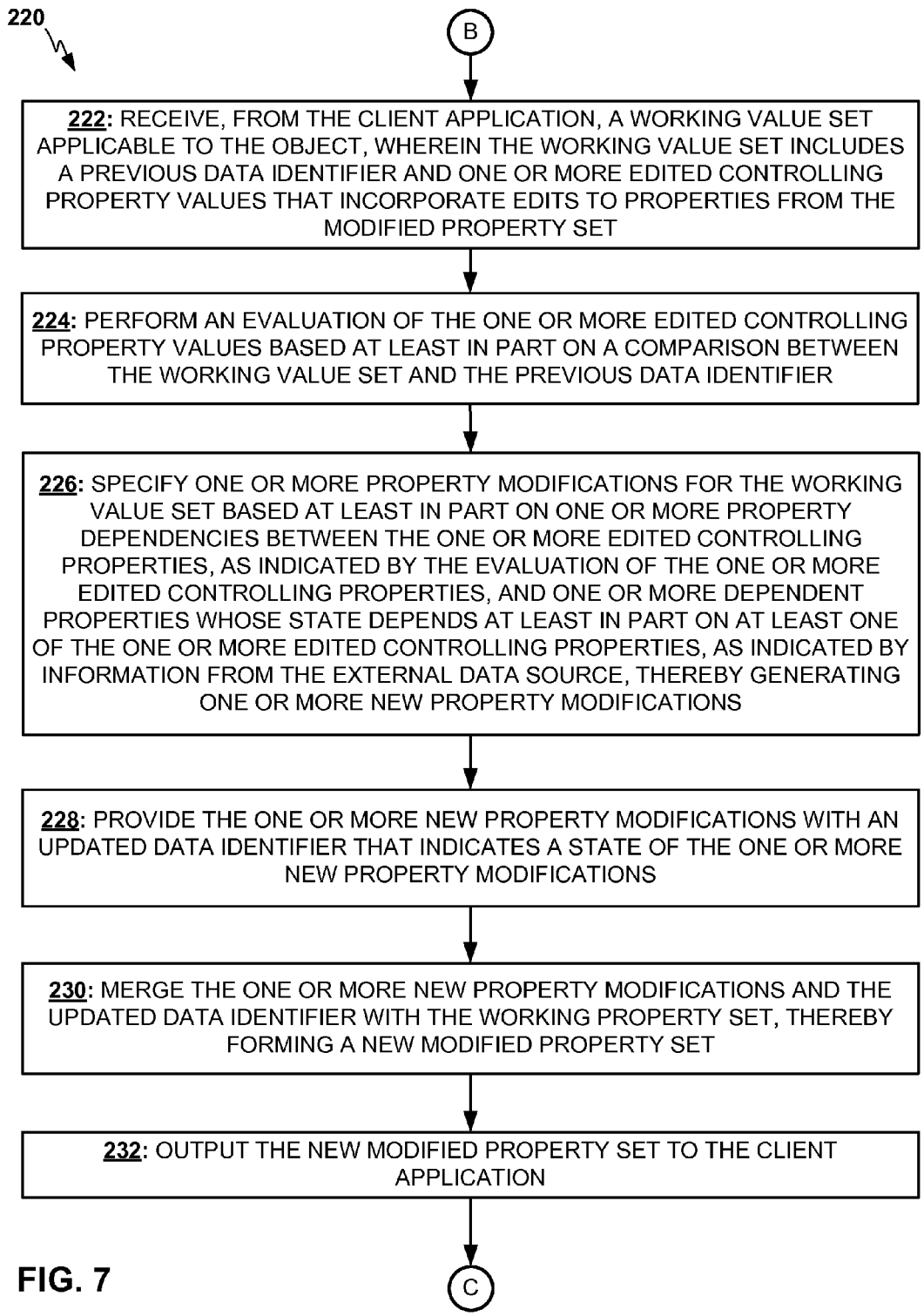
FIG. 7 is a flowchart illustrating operation of an example method for coordinating data between a client application and one or more external data sources.

FIG. 7 is a flowchart illustrating operation of an example method 220 that may be performed in addition to method 200 as shown in FIG. 6, and may provide further functionality together with method 200 of FIG. 6. One or more computing devices, such as either or both of servers 114 and 116 depicted in FIG. 2, may perform method 220. One example of method 220 may be described with reference to client services component 14 or external data service 16 of FIG. 1, each of which may be running on one or more processors of one or more computing devices, such as servers 114 and 116 depicted in FIG. 2.

One example of method 220 includes the client services component 14 receiving, from the client application 20, a working value set applicable to the object, wherein the working value set includes a previous data identifier and one or more edited controlling property values that incorporate edits to properties from the modified property set (222). Example method 220 further includes the external data service 16 performing an evaluation of the one or more edited controlling property values based at least in part on a comparison between the working value set and the previous data identifier (224). Example method 220 further includes the external data service 16 specifying one or more property modifications for the working value set based at least in part on one or more property dependencies between the one or more edited controlling property values, as indicated by the evaluation of the one or more edited controlling properties, and one or more dependent properties whose state depends at least in part on at least one of the one or more edited controlling properties, as indicated by information from the external data source 26, thereby generating one or more new property modifications (226). Example method 220 further includes the external data service 16 providing the one or more new property modifications with an updated data identifier that indicates a state of the one or more new property modifications combined with the property modifications represented by the previous data identifier (228). Example method 220 further includes the client services component 14 merging the one or more new property modifications and the updated data identifier with the working property set, thereby forming a new modified property set (230). The new modified property set contains only the properties that were indicated as having changes by the external data service. Example method 220 further includes the client services component 14 outputting the new modified property set of changed properties to the client application 20 (232).

The previous data identifier included in the working value set may be the initial data identifier, the first time that method 220 is performed, or it may be a previous updated data identifier from a previous update resulting from previously performing method 220, on a subsequent instance of performing method 220. The updated data identifier may indicate a state of the one or more new property modifications to the external data service 16. External data service 16 may remain stateless, and refer to the updated data identifier and compare the updated data identifier to the state as appropriate to the current working value set to determine properties that need new modifications. External data service 16 may then make any additional modifications to those properties based on current information from a relevant external data source 26. The data identifier may remain obscure to the client application 20 in that it does not convey information to client application 20 and only conveys meaning to external data service 16, so that client application 20 simply retains the data identifier and returns it with the value set to client services component 14 and external data service 16. Any portion of or all of method 220 may also be performed by only one software module executing on one server or other computing device, or on additional software modules and/or computing devices beyond those mentioned in the example above.

Figure 8:
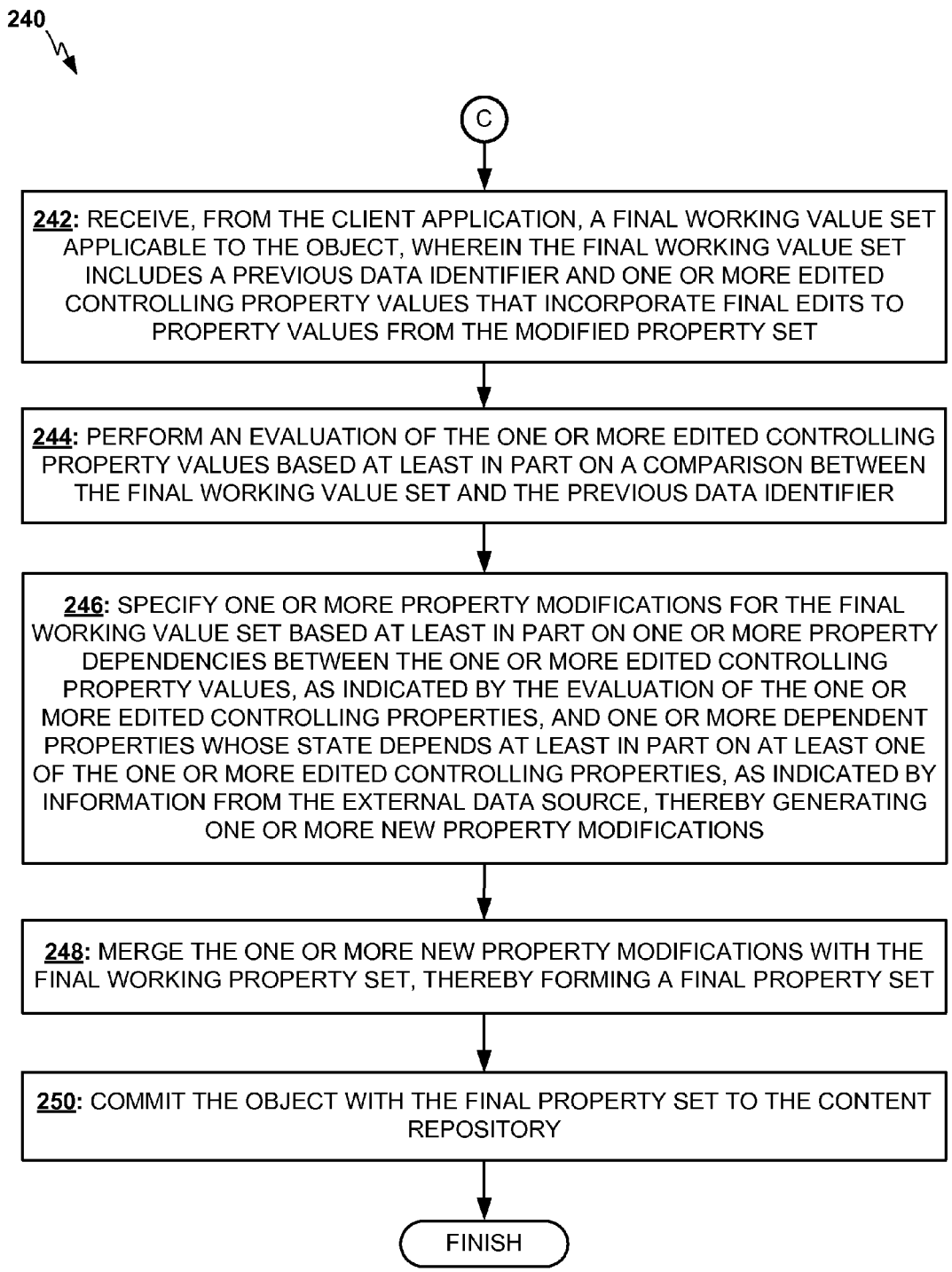
FIG. 8 is a flowchart illustrating operation of an example method for coordinating data between a client application and one or more external data sources.

FIG. 8 is a flowchart illustrating operation of an example method 240 for coordinating data between a client application and one or more external data sources, and may provide further functionality together with method 200 of FIG. 6, as well as with method 220 of FIG. 7. One or more computing devices, such as either or both of servers 114 and 116 depicted in FIG. 2, may perform method 240. One example of method 240 may be described with reference to client services component 14 or external data service 16 of FIG. 1, each of which may be running on one or more processors of one or more computing devices, such as servers 114 and 116 depicted in FIG. 2.

One example of method 240 is set forth as follows. In this example, method 240 includes the client services component 14 receiving, from the client application 20, a final working value set applicable to the object, wherein the final working value set includes a previous data identifier and one or more edited controlling property values that incorporate final edits to properties from the modified property set (242). Example method 220 further includes the external data service 16 performing an evaluation of the one or more edited controlling property values based at least in part on a comparison between the final working value set and the previous data identifier (244). Example method 220 further includes the external data service 16 specifying one or more property modifications for the final working value set based at least in part on one or more property dependencies between the one or more edited controlling property values, as indicated by the evaluation of the one or more edited controlling property values, and one or more dependent properties whose state depends at least in part on at least one of the one or more edited controlling property values, as indicated by information from the external data source 26, thereby generating one or more new property modifications (246). Example method 220 further includes the client services component 14 merging the one or more new property modifications with the final working property set, thereby forming a final property set (248). Example method 220 further includes the client services component 14 committing the object with the final property set to the content repository 24 (250).

The previous data identifier included in the working property set may be the initial data identifier, as indicated in method 200 shown in FIG. 6, or it may be a previous updated data identifier from a previous update resulting from previously performing method 220 of FIG. 7. The updated data identifier may indicate a state of the one or more property modifications to the external data service 16. Any portion of or all of method 220 may also be performed by only one software module executing on one server or other computing device, or on additional software modules and/or computing devices beyond those mentioned in the example above.

Figure 9:
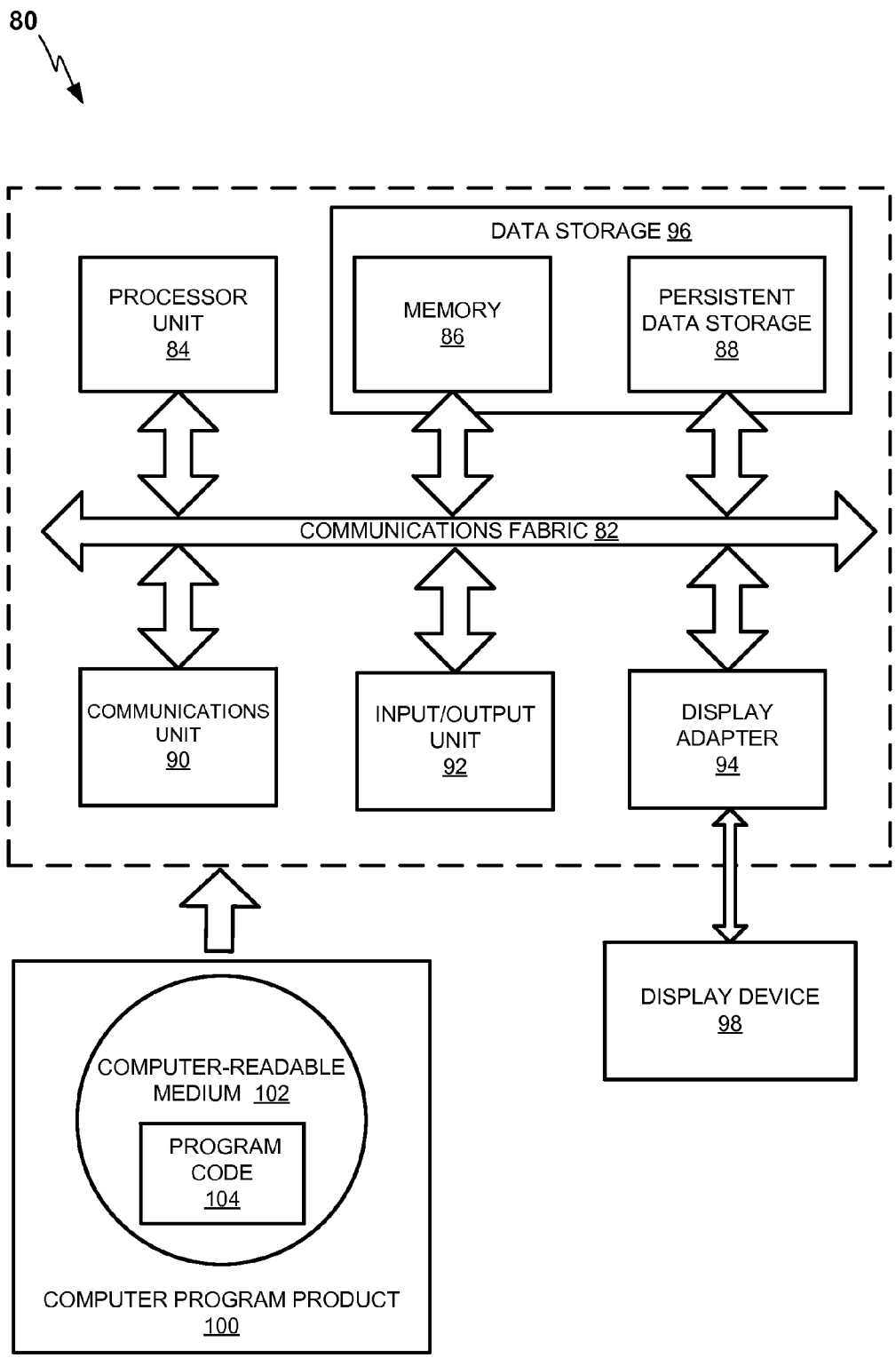
FIG. 9 is a block diagram of an example computing device that may be used for implementing all or part of a method of coordinating data between a client application and one or more external data sources.

FIG. 9 is a block diagram of an example computing device 80 that may be used for implementing all or part of a dynamic property data integration framework and an associated method of coordinating data between a client application and one or more external data sources, according to an illustrative example. The dynamic property data integration framework may be enabled to provide dynamic property data integration either by incorporating this capability natively, or adding it via a plug-in, add-on, or macro, or by running a separate program that modifies a framework, for example. Computing device 80 may be a workstation, server, mainframe computer, notebook or laptop computer, desktop computer, tablet, smartphone, feature phone, or other programmable data processing apparatus of any kind. Computing device 80 of FIG. 9 may represent any of servers 114, 116, or 120 as depicted in FIG. 2, for example. Servers 114 and/or 116 of FIG. 2 may also be implemented as virtual servers, either or both of which may execute on computing device 80 of FIG. 9, or on multiple computing devices that may include computing device 80 of FIG. 9. Any combination or all of the processes and capabilities disclosed herein may execute on computing device 80 or a combination of similar computing devices that may be implemented in a data center or a cloud data service with multiple redundant data centers, or in any other configuration. Other possibilities for computing device 80 are possible, including a computer having capabilities or formats other than or beyond those described herein.

In this illustrative example, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, but those skilled in the art will recognize that this also constitutes an example of a physical, tangible, non-transitory computer-readable data storage device. Executable instructions are stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a dynamic property data integration framework, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, a mobile device operating system such as iOS® from Apple® Inc., or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. Some of these examples may overlap with each other, or with example components of communications unit 90 or data storage 96. Input/output unit 92 may also include appropriate device drivers for any type of external device, or such device drivers may reside in the operating system or elsewhere on computing device 80 as appropriate.

Computing device 80 also includes a display adapter 94 in this illustrative example, which provides one or more connections for one or more display devices, such as display device 98, which may include any of a variety of types of display devices, including monitor 132 of FIG. 2. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology. Computer program code 104 may include a dynamic property data integration framework computer program, module, or portion of code for providing a dynamic property data integration framework as described above.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing processor unit 84 to generate physical outputs that correspond to the computer-executable instructions, in a way that modifies computing device 80 into a new physical state and causes computing device 80 to physically assume new capabilities that it did not have until its physical state was changed by loading the executable instructions comprised in program code 104.

In some illustrative examples, program code 104 may be downloaded over a network to data storage 96 from another device or computer system, such as a server, for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

Computing device 80 of FIG. 9 may be an implementation of either or both of client services application server 114 or external data service application server 116 of FIG. 2. In computing environment 110 of FIG. 2, network 125 and other communicative connections among client services application server 114, external data service application server 116, client application server 120, client computing device 122, content repository storage server 124, and external servers 126-128 may include one or more networks of any kind that may provide communications links between various devices and computers connected together within computing environment 110. Network 125 and other communicative connections in computing environment 110 may include connections, such as wire, wireless communication links, or fiber optic cables. In one example, network 125 is the Internet with a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network 125 may also be implemented as a number of different types of networks, such as for example, an intranet, a local area network (LAN), or a wide area network (WAN). FIG. 2 is an illustrative example, and not an architectural limitation for the variety of illustrative examples.

Client services application server 114 and external data service application server 116 may include any type of servers, and content repository storage server 124 may include any type of storage server, storage area network, redundant array of independent discs (RAID), storage device, cloud storage service, or any other type of data storage. Computing environment 125 may include additional servers, clients, storage elements, network elements, and various other devices not shown in FIG. 2.

Client computing device 122 as depicted in FIG. 2 may be connected to client application server 120 via any hard-line, wireless, or network connection. Client computing device 122 in this example has connected to it user input/output devices in the form of keyboard 136, mouse 138, and monitor 132 which may render a graphical user interface for a client application running on client application server 120. For example, client computing device 122 may run a web browser and receive web application data for a client web application that runs on client application server 120 and that interacts with a dynamic property data integration framework running on client services application server 114 and/or external data service application server 116, for example. Client computing device 122 may render the client application in a browser window of a web browser program being rendered on the display screen of monitor 132, in this example. The web browser program running on computing device 122 may provide a runtime for the client application.

As will be appreciated by one skilled in the art, aspects of the present invention may be embodied as a method, a computing system, or a computer program product, for example. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the present invention may take the form of a computer program product embodied in one or more computer-readable data storage devices or computer-readable data storage components that include computer-readable medium(s) having computer readable program code embodied thereon. For example, a computer-readable data storage device may be embodied as a tangible device that may include a tangible, non-transitory data storage medium, as well as a controller configured for receiving instructions from a resource such as a central processing unit (CPU) to retrieve information stored at one or more particular addresses in the tangible, non-transitory data storage medium, and for retrieving and providing the information stored at those particular one or more addresses in the data storage medium.

The data storage device may store information that encodes both instructions and data, for example, and may retrieve and communicate information encoding instructions and/or data to other resources such as a CPU, for example. The data storage device may take the form of a main memory component such as a hard disc drive or a flash drive in various embodiments, for example. The data storage device may also take the form of another memory component such as a RAM integrated circuit or a buffer or a local cache in any of a variety of forms, in various embodiments. This may include a cache integrated with a controller, a cache integrated with a graphics processing unit (GPU), a cache integrated with a system bus, a cache integrated with a multi-chip die, a cache integrated within a CPU, or the processor registers within a CPU, as various illustrative examples. The data storage apparatus or data storage system may also take a distributed form such as a redundant array of independent discs (RAID) system or a cloud-based data storage service, and still be considered to be a data storage component or data storage system as a part of or a component of an embodiment of a system of the present disclosure, in various embodiments.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, electro-optic, heat-assisted magnetic, or semiconductor system, apparatus, or device, or any suitable combination of the foregoing. A non-exhaustive list of additional specific examples of a computer readable storage medium includes the following: an electrical connection having one or more wires, a portable computer diskette, a hard disc, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device, for example.

Program code embodied on a computer readable medium may be transmitted using any appropriate medium, including but not limited to radio frequency (RF) or other wireless, wireline, optical fiber cable, etc., or any suitable combination of the foregoing. Computer program code for carrying out operations for aspects of the present invention may be written in any combination of one or more programming languages, including an object oriented programming language such as Java, Smalltalk, C++, Objective-C, or the like, or other imperative programming languages such as C, or functional languages such as Common Lisp, Haskell, or Clojure, or multi-paradigm languages such as C#, Python, Ruby, or Scala, among a variety of illustrative examples. One or more sets of applicable program code may execute partly or entirely on a user's desktop or laptop computer, smartphone, tablet, or other computing device; as a stand-alone software package, partly on the user's computing device and partly on a remote computing device; or entirely on one or more remote servers or other computing devices, among various examples. In the latter scenario, the remote computing device may be connected to the user's computing device through any type of network, including a local area network (LAN) or a wide area network (WAN), or the connection may be made to an external computer (for example, through a public network such as the Internet using an Internet Service Provider), and for which a virtual private network (VPN) may also optionally be used.

In various illustrative embodiments, various computer programs, software applications, modules, or other software elements may be executed in connection with one or more user interfaces being executed on a client computing device, that may also interact with one or more web server applications that may be running on one or more servers or other separate computing devices and may be executing or accessing other computer programs, software applications, modules, databases, data stores, or other software elements or data structures.

A graphical user interface may be executed on a client computing device and may access applications from the one or more web server applications, for example. Various content within a browser or dedicated application graphical user interface may be rendered or executed in or in association with the web browser using any combination of any release version of HTML, CSS, JavaScript, XML, AJAX, JSON, and various other languages or technologies. Other content may be provided by computer programs, software applications, modules, or other elements executed on the one or more web servers and written in any programming language and/or using or accessing any computer programs, software elements, data structures, or technologies, in various illustrative embodiments.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided as computer-executable code to a processor of a general purpose computer, special purpose computer, or other programmable data processing apparatus to produce a machine, such that the instructions, which execute via the processor of the computer or other programmable data processing apparatus, may create means for implementing the functions or acts specified in the flowchart and/or block diagram block or blocks.

These computer program instructions may also be stored in a computer readable medium that can cause a computer, other programmable data processing apparatus, or other devices to function in a particular manner, such that the executable instructions stored in the computer readable medium transform the computing device into an article of manufacture that embodies or implements the functions or acts specified in the flowchart and/or block diagram block or blocks. The computer program instructions may also be loaded onto a computer, other programmable data processing apparatus, or other devices to cause a series of operational steps to be performed on the computer, other programmable apparatus or other devices, to produce a computer implemented process such that the instructions which execute on the computer or other programmable apparatus provide or embody processes for implementing the functions or acts specified in the flowchart and/or block diagram block or blocks.

The flowchart and block diagrams in the figures illustrate the architecture, functionality, and operation of possible implementations of devices, methods and computer program products according to various embodiments of the present disclosure. In this regard, each block in the flowchart or block diagrams may represent a module, segment, or portion of code, which includes one or more executable instructions for implementing the specified logical function(s). In some implementations, the functions noted in the block may occur out of the order noted in the figures. For example, two blocks shown in succession may, in fact, be executed substantially concurrently, or the blocks may be executed in a different order, or the functions in different blocks may be processed in different but parallel threads, depending upon the functionality involved. Each block of the block diagrams and/or flowchart illustration, and combinations of blocks in the block diagrams and/or flowchart illustration, may be implemented by special purpose hardware-based systems that perform the specified functions or acts, or in any combination of special purpose hardware and computer-executable instructions running on general purpose hardware.

The description of the present disclosure has been presented for purposes of illustration and description, and is not intended to be exhaustive or limited to the disclosure in the form disclosed. Many modifications and variations will be understood by persons of ordinary skill in the art based on the concepts disclosed herein. The particular examples described were chosen and disclosed in order to explain the principles of the disclosure and example practical applications, and to enable persons of ordinary skill in the art to understand the disclosure for various embodiments with various modifications as are suited to the particular use contemplated. The various examples described herein and other embodiments are within the scope of the following claims.

What is claimed is:

1. A method performed by at least one computing device, comprising:

receiving, from a client application, a data identifier and a working property set, wherein the working property set specifies a modified working value of a controlling property, wherein the data identifier indicates a state of one or more property modifications to the working property set;

responsive to determining that the modified working value associated with the data identifier is different from an initial working value associated with the data identifier, accessing one or more external data sources to determine, based at least in part on a metadata modification definition indicated by the data identifier, the one or more property modifications to the working property set, wherein the metadata modification definition indicates one or more modifications to the modified working value and one or more dependent properties whose state depends at least in part on the modified working value;

configuring a modified property set based on the one or more property modifications applied to the working property set, wherein the modified property set includes the controlling property having the modified working value and an updated data identifier that indicates an updated state of the one or more property modifications to the working property set, and wherein the modified property set specifies the one or more dependent properties; and outputting, to the client application, the modified property set and the updated data identifier.

2. The method of claim 1, further comprising receiving, from the client application, a request to edit an object that is applicable to an initial property set.

3. The method of claim 1, wherein the working property set comprises a first working property set, wherein the modified working value of the controlling property comprises a first modified working value of the controlling property, wherein the modified property set comprises a first modified property set, wherein the property dependency of the metadata modification definition comprises an indication of one or more modifications to a first property dependency, and wherein the one or more dependent properties comprise one or more first dependent properties, the method further comprising:

receiving, from the client application, the updated data identifier and a second working property set, wherein the second working property set specifies a second modified working value of the controlling property, wherein the updated data identifier indicates a state of one or more property modifications to the second working property set;

responsive to determining that the second modified working value associated with the updated data identifier is different from the first modified working value associated with the updated data identifier, accessing the one or more external data sources to determine, based at least in part on the metadata modification definition comprising a second property dependency, one or more new property modifications to the second working property set, wherein the second property dependency indicates one or more modifications to the second modified working value and one or more second dependent properties whose state depends at least in part on the second working value;

configuring a second modified property set based on the one or more new property modifications applied to the second working property set, wherein the second modified property set includes the controlling property having the second modified working value and a new data identifier that indicates a new state of the one or more property modifications to the second working property set, and wherein the second modified property set specifies the one or more second dependent properties; and outputting, to the client application, the second modified property set and the new data identifier.

4. The method of claim 1, wherein the data identifier indicates, to an external data service, a previous state of a property set.

5. The method of claim 1, further comprising:

receiving, from the client application, the updated data identifier and a final working property set, wherein the final working property set specifies a final modified working value of the controlling property;

responsive to determining that the final working value associated with the updated data identifier is different from the modified working value associated with the updated data identifier, accessing the one or more external data sources to determine, based at least in part on the metadata modification definition indicated by the updated data identifier, one or more final property modifications to the final working property set, wherein the metadata modification definition indicates one or more modifications to the final modified working value and one or more final dependent properties whose state depends at least in part on the final modified working value;

configuring a final property set based on the one or more final property modifications applied to the final working property set, wherein the final property set includes the controlling property having the final working value, and wherein the final modified property set specifies the one or more final dependent properties; and committing the final property set to a content repository.

6. The method of claim 5, further comprising:

outputting, to the client application, the final property set.

7. The method of claim 1, wherein accessing the one or more external data sources to determine, based at least in part on the metadata modification definition indicated by the data identifier, the one or more property modifications to the working property set comprises:

passing the working property set from a client services component to an external data service; and querying, by the external data service, the one or more external data sources for updated information affecting the property dependency, wherein the one or more property modifications incorporate the updated information affecting the property dependency.

8. The method of claim 7, further comprising:

providing a structure and a configuration interface for the external data service;

receiving configuration data for the external data service via the configuration interface; and merging the configuration data with the structure to finalize the external data service.

9. The method of claim 1, wherein the modified property set comprises any one or more of: metadata, one or more values, or one or more attributes.

10. The method of claim 1, wherein determining the modified property set is performed by a client services component that executes on a first server, and wherein accessing the one or more external data sources to determine the one or more property modifications to the working property set is performed by an external data service that executes on a second server.

* * * * *